United States Patent [19]

Mochi-Bartolani et al.

[11] 3,931,038

[45] Jan. 6, 1976

[54] SCALE AND CORROSION INHIBITION FOR COOLING WATER SYSTEMS

[75] Inventors: Francesca Mochi-Bartolani; Mauro Minervini; Aurelio Mannini, all of Rome, Italy

[73] Assignee: Nalco Chemical Company, Oak Brook, Ill.

[22] Filed: July 31, 1973

[21] Appl. No.: 384,353

[52] U.S. Cl. .............. 252/181; 21/2.5 A; 21/2.7 A; 252/178; 252/389 A
[51] Int. Cl.² .............................................. C02B 5/00
[58] Field of Search ............... 252/178, 181, 389 A; 21/2.5 A, 2.7 A

[56] References Cited
UNITED STATES PATENTS

| | | | |
|---|---|---|---|
| 3,462,365 | 8/1969 | Vogelsang, Jr. | 252/180 |
| 3,518,203 | 6/1970 | Savinelli et al. | 21/2.7 A |

FOREIGN PATENTS OR APPLICATIONS

| | | | |
|---|---|---|---|
| 4,449 | 10/1879 | United Kingdom | 252/83 |

OTHER PUBLICATIONS

Hergert et al. "Isolation and Properties of Dispersants from Western Hemlock Bark" Forest Products Journal, Nov. 1965, pp. 485–491.

*Primary Examiner*—Benjamin R. Padgett
*Assistant Examiner*—Deborah L. Kyle
*Attorney, Agent, or Firm*—John G. Premo; John S. Roberts

[57] ABSTRACT

A corrosion and scale inhibiting composition and process useful in recirculating cooling water systems consisting essentially of the following components calculated as weight percent:

| | |
|---|---|
| Alkoxylated polyol phosphate ester | 30 to 50% |
| $ZnCl_2$ | 2 to 25% |
| Tannin | 5 to 25% |
| Water | 30 to 10% |

8 Claims, No Drawings

SCALE AND CORROSION INHIBITION FOR COOLING WATER SYSTEMS

The present invention is directed to a process and composition for scale and corrosion inhibition of metal surfaces in contact with cooling waters which are usually designated recirculating cooling waters. The twin problems of scale inhibition and corrosion resistance have been met by multi-component compositions and the present invention generally consists of three components; namely, (1) an alkoxylated polyol phosphate ester, (2) a soluble zinc salt such as $ZnCl_2$, and (3) a water-soluble tannin in an aqueous milieu.

The pH of cooling water systems previously utilized in the prior art has usually been in the range 6.0 to 7.5, the upper limit being to avoid corrosion and the lower limit to avoid scale formation. In the present composition it has been found that it is possible to operate in the alkaline range above 7.5 and up to 8.0 and 8.6, which is a substantial advantage, since the pH of cooling water systems normally is in the alkaline range (confer J. I. Bregman, Corrosion Inhibitors, MacMillan Company, 1963, pages 76 and 79).

A formulation showing the preferred percentages of the components is set out below in TABLE I:

TABLE I

| | Range | Preferred |
|---|---|---|
| 1) Alkoxylated polyol phosphate ester | 30–50% | 40% |
| 2) $ZnCl_2$ | 2–25% | 20% |
| 3) Tannin | 5–25% | 10% |
| 4) Water | 30–10% | 30% |

The alkoxylated polyol phosphate esters are esterified alkoxylated aliphatic polyhydric alcohols which contain from 2 to 6 carbon atoms and from 2 to 5 hydroxyl groups. The hydrogen in the hydroxyl groups is replaced by an R group wherein R is:

(A) $(AlkO)_nH$ or (B) 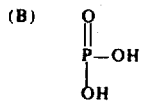

n is 1 to 30, and AlkO is an ethylene oxide, a propylene oxide or a butylene oxide with the proviso that at least one occurrence of R is (B).

A preferred group of alkoxylated polyol phosphate esters is presented in FORMULA I:

FORMULA I

R'(OR)y
where R' is an aliphatic hydrocarbon radical $C_1$-$C_6$
Y = 2-5
and where R is:

(A) $(AlkO)_nH$ or (B) 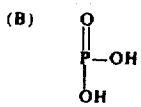

n = 1 to 30, and AlkO is an ethylene oxide, a propylene oxide or a butylene oxide with the proviso that at least one occurrence of R is (B).

A preferred group of alkoxylated glycerol phosphate esters is presented in FORMULA II:

FORMULA II

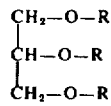

where R is:

(A) $(AlkO)_nH$ or (B) 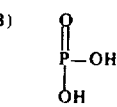

n is 1–10 and AlkO is ethylene oxide with the proviso that at least one occurrence of R is (B).

The aliphatic polyhydric alcohols from which the polyol phosphate esters are prepared may be selected from any number of well known commercially available alcohols. Illustrative are ethylene glycol, 1,2-propylene glycol, glycerin, pentaerythritol, 1,6-hexanediol, and the like. Of the above starting alcohols, glycerin is preferred.

The composition of TABLE I is utilized in cooling tower water in contact with iron and other metals normally used in the amount of 30 to 150 ppm and in a preferred range of about 50 ppm with a start up usually of 150 ppm for 48 hours.

The water medium contiguous with the present composition may be operated advantageously at an alkaline pH range as for example 8.0 to 8.6 without need of pH adjustment. It has been found that the composition acts to provide a protective film on metal surfaces and thus acts as a corrosion inhibitor and additionally is a powerful antiscale. The composition concentrate has the following characteristics:

| | |
|---|---|
| Color | Brown |
| Odor | Mild |
| Density (20°C) | 1.36–1.37 dg/lt (11.5 lb/gal) |
| Viscosity | 65–70 cps at 20°C |
| Pour Point | <20°C |
| pH of a 1% solution | 4.5–5.0 |

The concentrate may be added neat directly from the drum or diluted with water. In utilization it has been found that the recommended concentration should be maintained at a continuous level in the treated water and this concentration after start up at 150 ppm is recommended as between 30 and 100 ppm.

The concentration utilized is related to the stability index in that where the stability range is 6.0 to 6.5, then a preferred dosage of the composition is in the range 30 to 40; whereas, where the stability indices range is 7.5 to 8.5, then the dosage range for this composition is between 60 and 80.

THE COMPOSITION COMPONENTS

1. The Phosphate Component — The majority component in the present composition is a polyoxyalkylene ether derivative of glycerol and other polyols which has been further esterified with $P_2O_5$. The repeating alkylene oxide group may be a (alkylene-O)$_n$H including the terminal hydrogen where the alkylene oxide is preferably $(CH_2CH_2O)_n$ or polyethylene oxide and for solubility purposes n = 1 to 30 with a preferred range for n of 1 to 3, which value expresses the estherification of 1 or more of the glycerol hydroxy groups.

Operable but not preferred are polyalkylene oxides which include such compounds derived by the addition polymerization of 1,2-propylene oxide, 1,3-propylene oxide, and 1,2-butylene oxide.

$P_2O_5$ is utilized to carry out the esterification of the glycerol ether and the molar proportions are adjusted so that one or more glycerol hydroxyl groups are esterified.

The use of a 1:1 molar reactant mix of glycerol with $P_2O_5$ or an excess of glycerol suppresses the tendency of $P_2O_5$ to produce cyclic products with two of the glycerol hydroxy groups.

The compounds described above and utilized as anticorrosion components here are known in other fields and analogous compounds have been described as precursors for phosphorus containing flame-retardant polyurethane in U.S. Pat. No. 3,251,828 Lutz (FMC Corp.) where Examples 3 and 4 specifically teach glycerol + $P_2O_5$ + propylene oxide, and the teachings of the patent are herewith incorporated by reference in this invention Additionally, surface-active agents related to the present glycerol ether esters are described in U.S. Pat. No. 3,004,056 Nunn et al (GAF) although the thrust of the patent is devoted to monohydroxy phenol ethers rather than glycerol.

It is noted that as to scale prevention, phosphates have a favorable influence on scale based on alum in prevailing formation of a floc. In the present formulation the phosphate component combines the usefulness in one compound of an anti-floc agent as well as the inherent advantages of a surfactant.

2. The Zinc Component — The zinc component is utilized in water-soluble form as a zinc salt or zinc oxide and functions as a cathodic inhibitor of corrosion.

3. Water-soluble Tannins — Water-soluble tannins, including preferred alkali metal salts, either natural or synthetic, may be utilized. Also useful are lignins. Exemplary usable tannins include those described in Encyclopedia of Chemical Technology II, 12, 319–329, Interscience, 1967, which is incorporated by reference and also in the Betz Handbook, 6, 160 (1962) where natural tannins are divided into catechol and pyrogallol types of mixtures. Among the catechol tannins are cutch, quebracho, hemlock, larch, and gambier. Pyrogallol tannins include gallnuts, sumac, myrobalans, chestnut, valonia and dividivi. Synthetic tannins embrace naphthalenic syntans and aromatic hydroxy syntans.

EXAMPLE 1

A composition according to the present invention was prepared utilizing the composition of FORMULA III below:

FORMULA III

1. Ethoxylated glycerin phosphate ester 40% of the following formula:

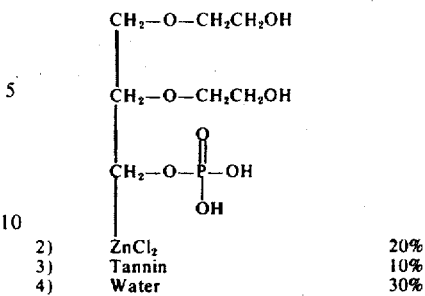

| | | |
|---|---|---|
| 2) | $ZnCl_2$ | 20% |
| 3) | Tannin | 10% |
| 4) | Water | 30% |

EXAMPLE 2

150 ppm of a solution of the composition in Example 1 was added to the cooling water of the tower and a start up regimen was followed for 48 hours, maintaining the pH between 7.2 to 7.7. After this initial period, the concentration of Example 1 Formula II in the system was decreased to 50 ppm. After a 60-day test period, it was noted that the system was exemplified by low corrosion and low scale.

EXAMPLE 3

In accordance with Example 1 but utilizing a different water as set out below, an additional industrial test was run.

| | |
|---|---|
| TDS | 1000 ppm |
| Calcium hardness | 500 ppm |
| Magnesium hardness | 300 ppm |
| M alkalinity | 250–300 ppm |
| Silica | 50 ppm |
| pH | 8.3–8.5 |

After 30 days, inspection of the heat transfer units, contiguous to the aqueous system, revealed little or no corrosion or scale.

EXAMPLE 4

An anticorrosion, antiscale composition was prepared and utilized according to Example 1. Additionally, a small amount of a slimicide was utilized. Excellent results were obtained.

EXAMPLE 5

An alkoxylated glycerin phosphate ester was prepared from $P_2O_5$ and glycerin to esterify the glycerin. Subsequently, ethylene oxide was added to the reactant mix to introduce an average of 30 ethylene oxide groups to etherify the remaining two hydroxyl groups of the glycerol molecule. Analysis showed that a portion of this composition was utilized in a cooling tower in southern Italy in amount of 80 ppm and the pH of the water had an average value of 8.1. After 30 days, there was noticeable lack of deposit as well as corrosion problems in the tower.

EXAMPLE 6

In the same manner as Example 5, a composition was prepared from $P_2O_5$ and glycerin which was subsequently etherified by utilizing propylene oxide to introduce the repeating alkoxy groups in the glycerol molecule. Analysis showed an average of 25 propylene oxy groups had been introduced. The cooling tower of Example 5 was operated 30 days and the concentrated cooling water exhibited an average pH of about 7.9. After 30 days, there was a noticeable lack of corrosion as well as deposits on the metal surfaces of the cooling system.

The embodiments of this invention in which an exclusive property or privilege is claimed are defined as follows:

1. A corrosion and scale inhibiting composition useful in preventing corrosion of iron and other metal surfaces in contact with cooling water consisting of:

|   |   | Range |
|---|---|---|
| 1) | Alkoxylated polyol phosphate ester | 30–50% |
| 2) | $ZnCl_2$ | 2–25% |
| 3) | Tannin | 5–25% |
| 4) | Water | 30–10% | wherein said polyol ester is $R'(OR)y$ where $R'$ is an aliphatic hydrocarbon radical from 1-6 carbon atoms and $Y = 2-5$ and where R is:

(A)  $(AlkO)_nH$ or (B)  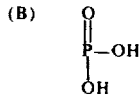

n is 1 to 30, and AlkO is an ethylene oxide, a propylene oxide or a butylene oxide with the proviso that at least one occurrence of R is (B).

2. The composition according to claim 1 consisting essentially of:

| 1) | Alkoxylated polyol phosphate ester | 40% |
|---|---|---|
| 2) | $ZnCl_2$ | 20% |
| 3) | Tannin | 10% |
| 4) | Water | 30% |

3. The composition according to claim 1 wherein the alkoxylated polyol phosphate ester is:

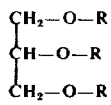

where R is:

(A)  $(AlkO)_nH$ or (B)  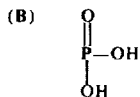

n is 1–10 and AlkO is ethylene oxide with the proviso that at least one occurrence of R is (B).

4. The composition according to claim 3 where n = 1.

5. A process for inhibiting scale and corrosion of a ferrous metal surface in contact with a corrosion cooling water medium which comprises maintaining contact of said surface with said water which additionally contains between 30 to 150 ppm of a composition in weight percent consisting of:

|   |   | Range |
|---|---|---|
| 1) | Alkoxylated polyol phosphate ester | 30–50% |
| 2) | $ZnCl_2$ | 2–25% |
| 3) | Tannin | 5–25% |
| 4) | Water | 30–10% | wherein said polyol ester is $R'(OR)Y$ where $R'$ is an aliphatic hydrocarbon radical from 1–6 carbon atoms and $Y = 2-5$ and where R is:

(A)  $(AlkO)_nH$ or (B)  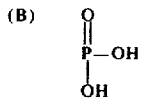

n is 1 to 30, and AlkO is an ethylene oxide, a propylene oxide or a butylene oxide with the proviso that at least one occurrence of R is (B).

6. The process according to claim 5 wherein the percentage relationships are as follows:

| 1) | Alkoxylated polyol phosphate ester | 40% |
|---|---|---|
| 2) | $ZnCl_2$ | 20% |
| 3) | Tannin | 10% |
| 4) | Water | 30% |

7. The process according to claim 5 wherein the alkoxylated polyol phosphate ester is:

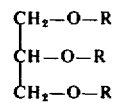

where R is:

(A)  $(AlkO)_nH$ or (B)  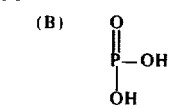

n is 1–10 and AlkO is ethylene oxide with the proviso that at least one occurrence of R is (B).

8. The process according to claim 7 where n = 1.

* * * * *

UNITED STATES PATENT OFFICE
CERTIFICATE OF CORRECTION

PATENT NO. : 3,931,038
DATED : JANUARY 6, 1976
INVENTOR(S) : FRANCESCA MOCHI-BARTOLANI, MAURO MINERVINI and AURELIO MANNINI It is certified that error appears in the above–identified patent and that said Letters Patent are hereby corrected as shown below:

IN THE CLAIMS:

CLAIM 5 - LINE 15;"R'(OR)Y"- SHOULD READ "R'(OR)y".

Signed and Sealed this twentieth Day of April 1976

[SEAL]

Attest:

RUTH C. MASON
Attesting Officer

C. MARSHALL DANN
Commissioner of Patents and Trademarks